No. 777,425. PATENTED DEC. 13, 1904.
L. G. LANGSTAFF.
VESSEL FOR DISPENSING LIQUIDS.
APPLICATION FILED MAR. 25, 1904.
NO MODEL.
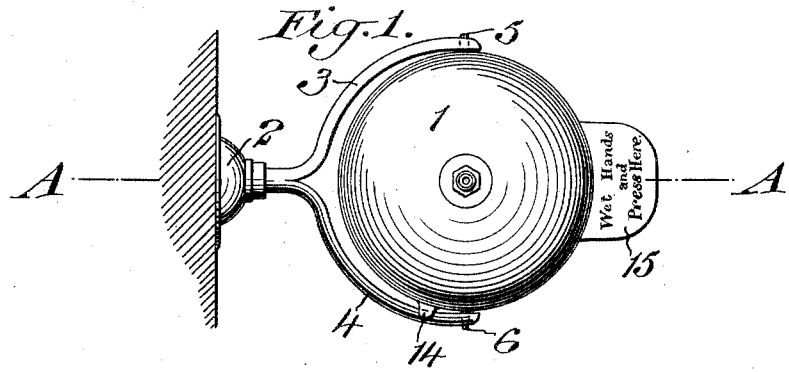
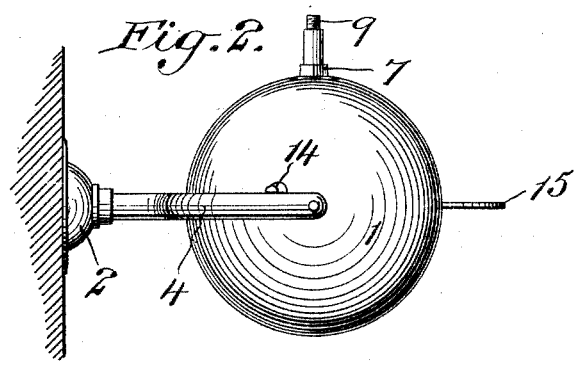
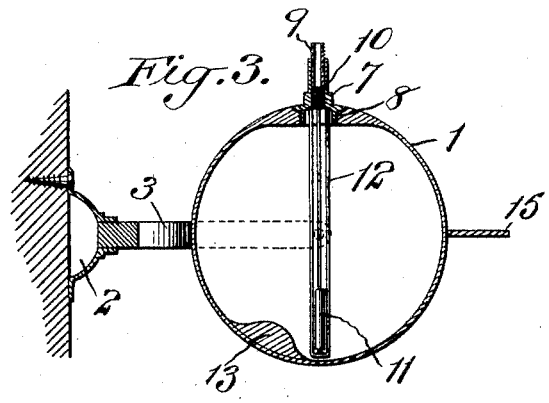
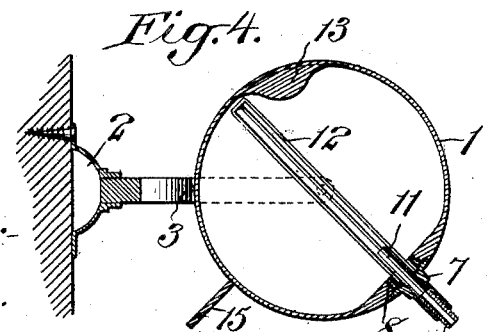
Witnesses:
F. George Barry.
Henry Thieme.
Inventor:
Lewis G. Langstaff
by attorneys
Thomas Seward No. 777,425.                                    Patented December 13, 1904.

UNITED STATES PATENT OFFICE.

LEWIS G. LANGSTAFF, OF NEW YORK, N. Y.

VESSEL FOR DISPENSING LIQUIDS.

SPECIFICATION forming part of Letters Patent No. 777,425, dated December 13, 1904.

Application filed March 25, 1904. Serial No. 200,010. (No model.)

*To all whom it may concern:*

Be it known that I, LEWIS G. LANGSTAFF, a citizen of the United States, and a resident of the borough of Brooklyn, in the city and State of New York, have invented a new and useful Improvement in Vessels for Dispensing Liquids, of which the following is a specification.

My invention relates to an improvement in vessels for dispensing liquids, and has for its object to provide a very simple and effective device for insuring the delivery of a predetermined quantity of liquid from a vessel.

My invention is particularly directed to vessels for dispensing liquid soap or other liquid cleansing or antiseptic substances into the hands.

A practical embodiment of my invention is represented in the accompanying drawings, in which—

Figure 1 represents the vessel in top plan. Fig. 2 is a side view of the same in its normal position. Fig. 3 is a vertical central section through the same in its normal position, the section being taken in the plane of the line A A of Fig. 1; and Fig. 4 is a similar section with the vessel inverted.

The vessel is herein represented as a hollow sphere, (denoted by 1.) A bracket for the vessel comprises a suitable base 2, fitted to be secured to the wall or other support, which base is provided with arms 3 4, between which the vessel is pivoted to swing in a vertical plane. These pivot connections between the vessel and bracket are denoted by 5 6.

The top of the vessel is provided with a measuring-nozzle 7, having its inner wall screw-threaded for a considerable distance from its outer end toward its inner end. This nozzle 7 has a screw-threaded engagement 8 with the said vessel. An exteriorly-threaded hollow tip 9 is engaged with the threaded portion of the nozzle 7. By turning the tip 9 in one direction or the other a dispensing-chamber 10 of varying capacity may be formed in the nozzle 7.

The means which I have shown for insuring the delivery of a predetermined amount of liquid from the vessel when the vessel is inverted is constructed, arranged, and operated as follows: A weighted plunger 11 is mounted to slide in a guide 12, which extends downwardly from the nozzle 7 to a point near the bottom of the vessel. This guide 12 in the present instance is shown as a framework composed of several parallel bars for confining the weighted plunger 11 between them. The diameter of the weighted plunger 11 is slightly less than the diameter of the dispensing-chamber 10 in the nozzle, so that when the nozzle is inverted the weighted plunger will be guided into the said dispensing-chamber until stopped by the inner end of the tip 9.

The momentum which the weighted plunger 11 attains when the vessel is inverted is sufficient to insure the rapid delivery of the liquid which has filled the chamber 10 when the vessel was inverted, even if the liquid is of that character which will not flow rapidly of itself. Furthermore, the delivery of a predetermined quantity of this liquid is thus accurately determined.

To insure the automatic return of the vessel to its normal position, I provide the vessel with a weight 13, located, preferably, a little to one side of its lowest point. This weight would tend to swing the vessel a little past its vertical position. To prevent this, I provide the exterior of the vessel with a lug or stop 14, fitted to engage the arm 4 of the bracket when the vessel has reached a vertical position.

To facilitate the tilting of the vessel, I provide the same with a handle 15, located on the front wall of the vessel.

It is evident that the shape of the vessel may be varied, also that other forms of carrying the weighted plunger may be employed, without departing from the spirit and scope of my invention. Hence I do not wish to limit myself strictly to the construction herein set forth; but

What I claim is—

1. In combination, a bracket, a liquid-dispensing vessel pivoted thereto, a nozzle having a dispensing-chamber therein and a weighted plunger fitted to slide into said chamber and positively eject the liquid therefrom when the vessel is inverted and to slide out of said chamber when the vessel is in its normal position.

2. A bracket, a liquid-dispensing vessel pivoted thereto, a nozzle having a dispensing-chamber therein, means for adjusting the capacity of the dispensing-chamber and means for positively ejecting the liquid from the chamber when the vessel is inverted.

3. A bracket, a liquid-dispensing vessel pivoted thereto, a nozzle having a dispensing-chamber therein, means for adjusting the capacity of the dispensing-chamber and a gravity device for positively ejecting the liquid from the chamber when the vessel is inverted.

4. In combination, a bracket, a liquid-dispensing vessel pivoted thereto, a nozzle having a dispensing-chamber therein, an adjustable tip for varying the capacity of the chamber and a weighted plunger fitted to enter said chamber to positively eject the liquid therefrom through the tip when the vessel is inverted.

In testimony that I claim the foregoing as my invention I have signed my name, in presence of two witnesses, this 11th day of March, 1904.

LEWIS G. LANGSTAFF.

Witnesses:
 FREDK. HAYNES,
 HENRY THIEME.